(12) United States Patent
Schieszl

(10) Patent No.: US 8,857,398 B2
(45) Date of Patent: Oct. 14, 2014

(54) COUPLING DEVICE AND FRESH AIR SYSTEM

(75) Inventor: Andreas Schieszl, Ellwangen (DE)

(73) Assignee: Mahle International GmbH (DE)

( * ) Notice: Subject to any disclaimer, the term of this patent is extended or adjusted under 35 U.S.C. 154(b) by 10 days.

(21) Appl. No.: 13/514,849

(22) PCT Filed: Dec. 6, 2010

(86) PCT No.: PCT/EP2010/068919
§ 371 (c)(1),
(2), (4) Date: Aug. 17, 2012

(87) PCT Pub. No.: WO2011/069938
PCT Pub. Date: Jun. 16, 2011

(65) Prior Publication Data
US 2012/0298063 A1 Nov. 29, 2012

(30) Foreign Application Priority Data
Dec. 11, 2009 (DE) .......................... 10 2009 057 867

(51) Int. Cl.
*F02M 35/10* (2006.01)

(52) U.S. Cl.
USPC ....... 123/184.21; 285/377; 285/396; 285/402

(58) Field of Classification Search
USPC ............. 123/184.21; 285/321, 305, 309, 377, 285/396, 402, 226, 91
See application file for complete search history.

(56) References Cited

U.S. PATENT DOCUMENTS

| | | | | |
|---|---|---|---|---|
| 3,019,037 A | * | 1/1962 | Caldwell | 285/226 |
| 3,827,816 A | * | 8/1974 | Knapp et al. | 403/322.2 |
| 4,165,910 A | * | 8/1979 | Anderson | 439/318 |
| 5,014,591 A | * | 5/1991 | Porter, Jr. | 89/6 |
| 5,318,332 A | * | 6/1994 | Hohmann et al. | 285/24 |

(Continued)

FOREIGN PATENT DOCUMENTS

| | | |
|---|---|---|
| DE | 19837767 A1 | 2/2000 |
| DE | 10307921 B3 | 8/2004 |

(Continued)

OTHER PUBLICATIONS

English abstract provided for DE-10307921.

(Continued)

*Primary Examiner* — Noah Kamen
*Assistant Examiner* — Long T Tran
(74) *Attorney, Agent, or Firm* — Rader, Fishman & Grauer PLLC

(57) ABSTRACT

A coupling device may include a first cylindrical connecting body and a second cylindrical connecting body having a retaining ring rotatably mounted thereon and moveable between a locking position and an unlocking position. A detent device may have at least one detent formed on the retaining ring and at least one counter detent formed on the second cylindrical connecting body with which the detent interlocks upon reaching the locking position. The detent may have a detent arm arranged on the retaining ring and configured to be spring-elastic in the radial direction. The counter detent may have a detent opening which is formed in a collar enclosing the retaining ring and in which the detent arm radially engages upon reaching the locking position so as to be supported on an edge of the detent opening in order to be rotatably secured in the circumferential direction.

23 Claims, 8 Drawing Sheets

(56) References Cited

U.S. PATENT DOCUMENTS

| | | | |
|---|---|---|---|
| 5,653,475 A * | 8/1997 | Scheyhing et al. | 285/54 |
| 6,131,881 A | 10/2000 | Preisser | |
| 7,832,775 B2 * | 11/2010 | Regener et al. | 285/377 |
| 2006/0022460 A1 * | 2/2006 | Callahan | 285/305 |
| 2007/0216161 A1 * | 9/2007 | Regener et al. | 285/377 |
| 2009/0037461 A1 | 2/2009 | Rukonic et al. | |

FOREIGN PATENT DOCUMENTS

| | | |
|---|---|---|
| DE | 202006004407 U1 | 7/2007 |
| DE | 102008028939 A1 | 4/2009 |
| FR | 2854675 A1 | 11/2004 |

OTHER PUBLICATIONS

English abstract for FR-2854675.

\* cited by examiner

COUPLING DEVICE AND FRESH AIR SYSTEM

CROSS-REFERENCE TO RELATED APPLICATIONS

This application claims priority to German Patent Application 10 2009 057 867.6 filed on Dec. 11, 2009 and PCT/EP2010/068919 filed on Dec. 6, 2010, which are hereby incorporated by reference in their entireties.

TECHNICAL FIELD

The present invention relates to a coupling device for a fresh air system for an internal combustion engine, in particular of a motor vehicle, for the communicating connection of two components of the fresh air system to one another. The invention further relates to a fresh air system equipped with such a coupling device.

BACKGROUND

When assembling a fresh air system, different components of the fresh air system have to be connected to one another in a communicating manner. For example, an air filter housing has to be connected to a fresh air distributor housing. Likewise, it can be necessary to connect hoses or pipes to one another or to a housing. Here, coupling devices can be employed.

SUMMARY

The present invention is concerned with the problem of providing for a coupling device of the aforementioned type and for a fresh air system an improved embodiment which is in particular characterized in that it is suitable for a series production, for example in that it enables establishing the communicating connection in a particularly simple manner. Furthermore, it shall be possible to disconnect the established connection again in a simple manner, for example for maintenance purposes.

This problem is solved according to the invention by the subject matters of the independent claims. Advantageous embodiments are subject matter of the dependent claims.

The invention is based on the general idea to equip the coupling device with two fluid-conveying connecting bodies, wherein the one connecting body has detent elements while the other connecting body is equipped with a retaining ring that is rotatably arranged thereon and has detent contours which are complementary to said detent elements. In a locking position of the retaining ring, the detent elements positively engage the detent contours from behind. In an unlocking position of the retaining ring, the detent can be fed axially through passages which the retaining ring comprises in the circumferential direction between the detent contours. With the proposed construction, the two connecting bodies can be assembled and disassembled through pure axial movements. Locking and unlocking is then carried out by rotating the retaining ring. Establishing and detaching the communicating connection of the two components of the fresh air system is therefore in particular possible without a rotational movement between the two components, which is an advantage in particular in the case if relatively little installation space is available for rotating the components. This is regularly the case in vehicles, in particular in their motor compartment. Thus, when used in a fresh air system, the proposed coupling device simplifies the series production of the fresh air system and the fresh air system's installation in a vehicle in a series production. Furthermore, the retaining ring can be actuated "blind", thus even at positions which are hidden and difficult to access or are barely visible. This too simplifies assembly and disassembly.

Moreover, the coupling device according to the invention is equipped with a detent device for non-rotatably locking the retaining ring in the locking position. With this measure, unintentionally rotating the retaining ring from the locking position into the unlocking position can be avoided. Thus, the fluidic connection between the respective components established by means of the coupling device can be effectively secured.

According to an advantageous embodiment, the detent device can comprise at least one detent which is formed on the retaining ring and at least one counter detent which is formed on the first connecting body or the second connecting body and by means of which the detent interlocks upon reaching the locking position and forms a positive rotation prevention mechanism. Through this proposal, the detent device is structurally integrated in the retaining ring and one of the connecting bodies. Thus, the detent device can be implemented in a comparatively inexpensive manner and with comparatively little required installation space. It is in particular possible to form the respective detent integrally on the retaining ring. Additionally or alternatively, the respective counter detent can be integrally formed on the respective connecting body. This integral construction avoids additional components, which reduces the cost for producing the coupling device.

According to another advantageous embodiment, the detent can be formed on an actuating element of the retaining ring, via which actuating element, forces for rotatably displacing the retaining ring can be transmitted. In this embodiment, the interlock acts directly where usually forces for rotatably displacing the retaining ring are transmitted, whereby a particularly effective rotation prevention mechanism can be implemented. In a refinement of the present invention, the counter detent can be formed in the region of an opening which is penetrated by the actuating element and arranged on a collar which is formed on the second connecting body and encloses the retaining ring. Through said collar, the retaining ring is positioned in a defined manner and rotatably mounted on the second connecting body. The configuration of the counter detent at an aperture of this collar enables a particularly stable positive retaining mechanism.

In another embodiment, the detent can have a detent arm that is spring-elastically arranged on the retaining ring, wherein in this case, the counter detent comprises a detent opening which is formed in a collar enclosing the retaining ring. When the locking position is reached, the detent arm engages radially in said detent opening and is supported in the circumferential direction on an edge of the detent opening so as to be secured in a non-rotatable manner. Hereby, a particularly stable interlock is implemented. At the same time, the radially spring-elastic detent arm enables a simple release of the interlock when the retaining ring is to be accurately transferred into the unlocking position.

It is principally possible to configure the detent and/or the counter detent in such a manner that for releasing the interlock, said is configured to be spring-elastically movable in the transverse direction.

According to an advantageous embodiment, the connecting bodies can be secured in the locking position of the retaining ring against rotation relative to one another exclusively through a nonpositive locking, in particular a frictional locking. With this construction, additional measures which, for example, implement a positive rotation prevention mechanism are not required. Because of this, the coupling device is designed to be in particular comparatively short, thus compact, in its insertion direction. Particularly advantageous is an embodiment in which the force preventing the rotation is generated by compressing a seal which seals the two connecting bodies in the locking position with respect to each other. Hereby, the seal is given a double function. Furthermore, with the seal being present, additional measures for generating a force preventing rotation can be dispensed with.

In an alternative embodiment, a rotation prevention mechanism can be provided by means of a positive locking, e.g., in the form of an axial guide acting between the connecting bodies.

Further important features and advantages of the invention arise from the sub-claims, from the drawings, and from the associated description of the figures based on the drawings.

It is to be understood that the above mentioned features and the features still to be explained hereinafter are not only usable in the respective mentioned combination but also in other combinations or alone without departing from the context of the present invention.

Preferred exemplary embodiments of the invention are illustrated in the drawings and are explained in the following description in more detail, wherein identical reference numbers refer to identical, or similar, or functionally identical components.

BRIEF DESCRIPTION OF THE DRAWINGS

In the figures, schematically

DETAILED DESCRIPTION

Figure 1:
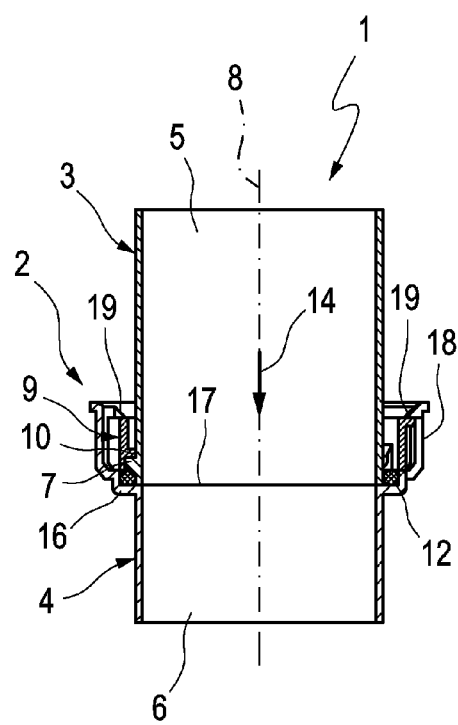
FIG. 1 shows a longitudinal section through a fresh air system in the region of a coupling device.
Figure 2:
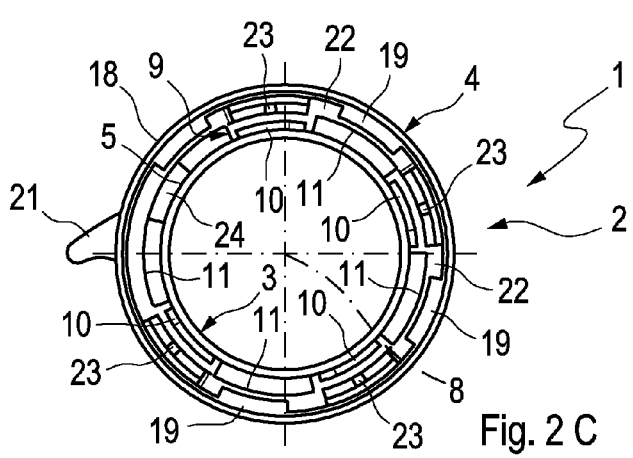

According to FIG. 1, a fresh air system 1 comprises a coupling device 2 in order to be able to connect two components 3, 4 of the fresh air system 1 to each other in a communicating manner. The fresh air system 1 serves for supplying an internal combustion engine with fresh air, wherein the internal combustion engine is arranged in particular in a motor vehicle. The two components 3, 4 which are connected to each other in a communicating manner by means of the coupling device 2 can involve line sections, pipes, hoses as well as housings such as, for example, an air filter housing, a fresh air distributor housing, a compressor housing, a supercharger housing and an intake module housing. For example, the coupling device 2 can connect two housings to each other or two lines or pipes or hoses. Likewise, the coupling device 2 is suitable for connecting a housing to a line, a pipe or a hose. Moreover, the coupling device 2 introduced here in connection with the fresh air system 1 can also be used completely independently of the fresh air system 1 in order to connect any desired components to each other in a communicating manner which are independent of a fresh air system 1, in particular fluid-conveying housings, lines, pipes and hoses. For example, by means of the coupling device, a coolant hose can be connected to a vehicle cooler.

The coupling device 2 has two cylindrical connecting bodies, namely a first connecting body 5 and a second connecting body 6. The respective connecting body 5, 6 can be integrally formed on the associated components 3 and 4, respectively. Likewise, the respective connecting body 5, 6 can be assembled in a suitable manner on the associated component 3, 4. For example, the respective connecting body 5, 6 can form a connecting piece or an end portion on the associated component 3, 4.

The first connecting body 5 has on its outer side a plurality of detent elements 7 which are arranged spaced apart from one another in the circumferential direction and protrude radially outward. The terms "circumferential direction" and "radial" as well as "axial" in the following refer to a longitudinal center axis 8 of the cylindrical, in particular circular cylindrical, connecting bodies 5, 6. The second connecting body 6 has a retaining ring 9 which is arranged coaxial to the longitudinal center axis 8 and is mounted on the second connecting body 6 to be rotatable about the longitudinal center axis 8. The retaining ring 9 can be rotated between a locking position and an unlocking position. The rotation angle between the locking position and the unlocking position, which each can form end positions, is relatively small and is, for example, approximately 30°±10°. The retaining ring 9 has detent contours 10 which are arranged complementary to the detent elements 7, namely in such a manner that in the assembled state, the detent elements 7 can engage behind said detent contours. FIG. 1 shows a locked state of the coupling device 2 with the retaining ring 9 being rotated into its locking position. Accordingly, in the locking position, the detent elements 7 are positively engaged behind the detent contours 10.

According to the FIGS. 1 to 7, the retaining ring 9 comprises in addition passages 11 which are located in the circumferential direction in each case between two adjacent detent contours 10 and which are likewise arranged complementary to the detent elements 7. Once the retaining ring 9 is displaced into its unlocking position, the locking elements 7 can be axially fed through the passages 11. This means that the two connecting bodies 5, 6 can be axially pulled apart if the retaining ring 9 is displaced into its unlocking position. For disconnecting or releasing the communicating connection of the coupling device 2, thus, no rotational movement between the connecting bodies 5, 6 is required. Disconnecting or releasing the connection can be carried out through a pure axial movement.

Figure 4:
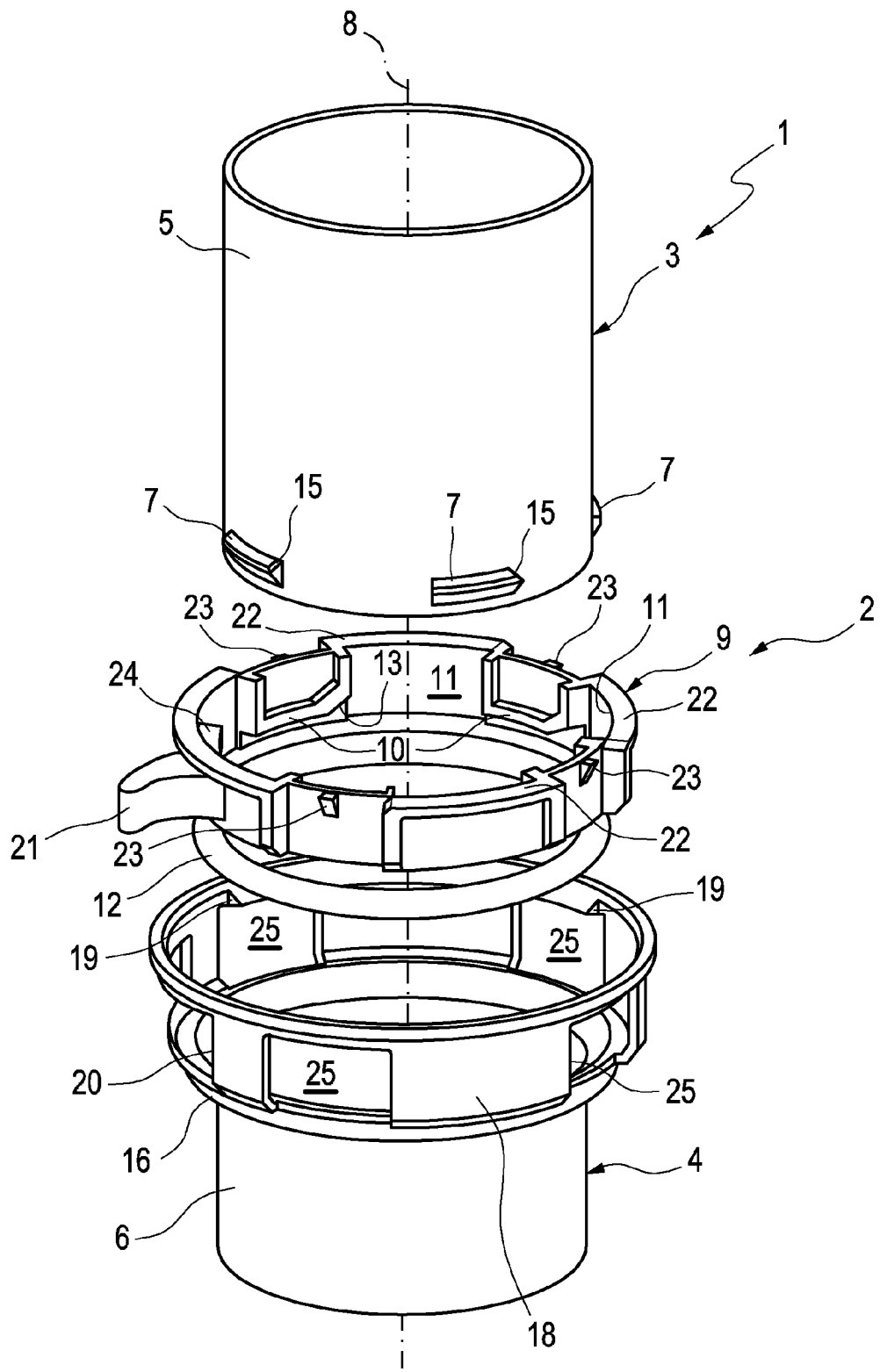
FIG. 4 shows a perspective view of the coupling device in an exploded view.

According to the FIGS. 1 and 4, the coupling device 2 can also have a seal 12, advantageously in the form of an O-ring. The seal 12 is arranged here such that it seals the first connecting body 5 with respect to the second connecting body 6.

In the example, the seal 12 is arranged such that it mainly seals radially. For this purpose, said seal is radially pressed between the connecting bodies 5, 6, thus elastically compressed. Since in the shown example, the seal rests axially against one of the connecting bodies 5, 6, it has in addition a certain axial sealing effect. As an alternative, a purely axially acting seal 12 can also be provided. An axially acting seal 12 is axially pressed between the two connecting bodies 5, 6.

In the locked state of the coupling device 2, the connecting bodies 5, 6 can be secured against rotation relative to one another. Particularly advantageous is an embodiment in which the rotation prevention mechanism is implemented exclusively through a nonpositive locking, namely in particular through a frictional locking. The seal 12 can contribute in a particular manner to this by being appropriately compressed. The seal 12 has a relatively high static friction resistance with respect to the connecting bodies 5, 6 so that in the case of a respective loading of the seal 12, said connecting bodies are appropriately secured against rotation. Additionally or alternatively to this, a rotation prevention mechanism working through a positive locking can also be provided. For example, such a separate rotation prevention mechanism, which is not shown here, can be implemented through a longitudinal or axial guide which, on the one hand, makes it easier to find a proper insertion position in which the connecting bodies 5, 6 can be inserted in one another. On the other hand, the axial guide facilitates the insertion process itself. Such an axial guide which works through a positive locking and, at the same time, forms a rotation prevention mechanism can be implemented, for example, by means of at least one tongue and groove connection which has an axial groove on the one connecting body 5, 6, and a radially protruding and axially extending rib as a tongue on the other connecting body 5, 6.

In the embodiment shown here, the retaining ring 9 is configured in a relatively dimensionally stable manner, namely such that the first connecting body 5 can only be axially inserted into the second connecting body 6 if the retaining ring 9 is in its unlocking position and if the detent elements 7 are aligned with the passages 11. This means that the communicating connection between the two connecting bodies 5, 6 can only be established if the retaining ring 9 is in its unlocking position. In another non-illustrated embodiment, the retaining ring 9 can also be configured dimensionally elastic to such an extent that the first connecting body 5 with the detent elements 7 being aligned with the detent contours 10 can be inserted into the second connecting body 6, and the detent elements 7 can be interlocked at the detent contours 10 if the retaining ring 9 is in its locking position. In other words, the communicating connection between the connecting bodies 5, 6 can be established even if the retaining ring 9 is in its locking position. In the course of this, the detent elements 7 displace the detent contours 10 radially outward during the insertion, which is enabled through the elasticity of the retaining ring 9. As soon as the detent elements 7 have passed the detent contours 10, the latter spring back radially inward resulting in an interlock which can only be released by rotating the retaining ring 9 into its unlocking position. This construction results in a further simplification of the assembly because for this, the retaining 9 itself does not have to be accessible anymore.

Figure 5:
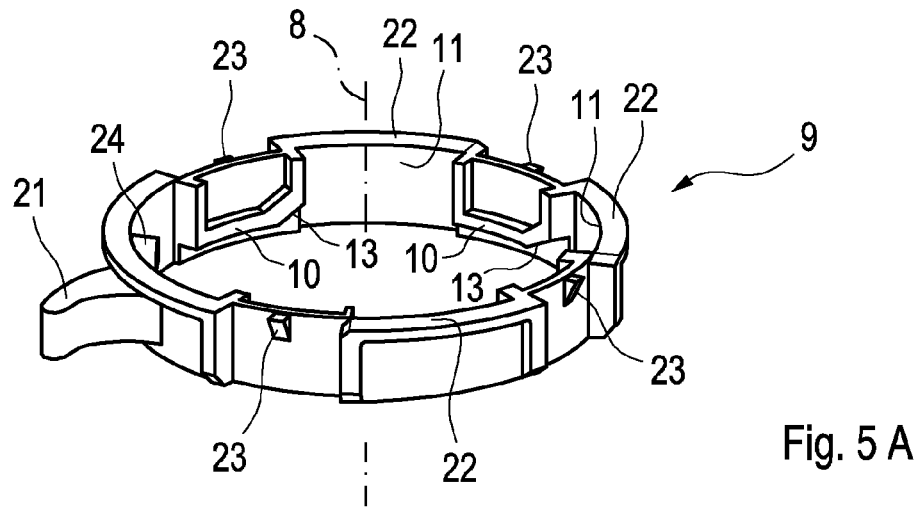
FIG. 5 shows a retaining ring of the coupling device in a perspective view (A), in a side view (B) and in an axial view (C)
Figure 5:
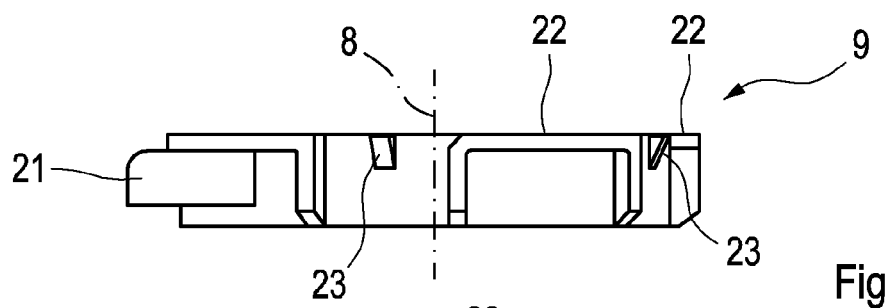
Figure 5:
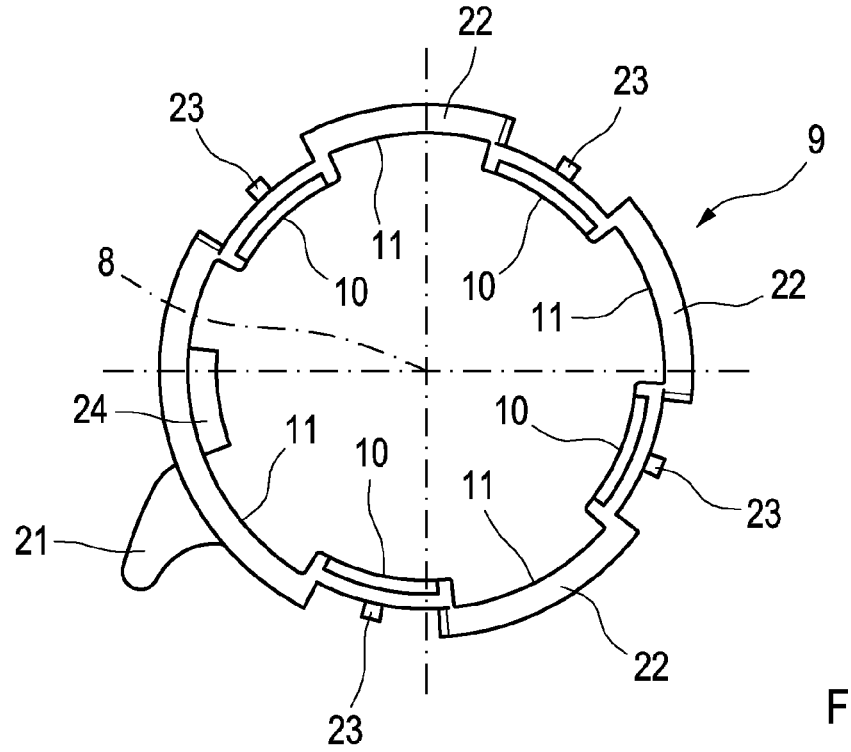

According to the FIGS. 4 and 5, the retaining ring 9 has lead-in chamfers 13 on the detent contours 10, which chamfers 13 are advantageously oriented in the circumferential direction. With the first connecting body 5 being inserted, these lead-in chamfers facilitate the movement over the detent elements 7 and, during the rotation of the retaining ring 9 into the locking position, effect an axial forward feed of the detent elements 7 in the insertion direction which is indicated, for example in FIG. 1, by an arrow designated with 14. The insertion direction 14 is a relative movement which refers to the first connecting body 5 with regard to the second connecting body 6. It is clear that it is principally also possible to fit the second connecting body 6 onto the first connecting body 5. In this case, a corresponding fitting direction is oriented opposite the insertion direction 14.

Figure 7:
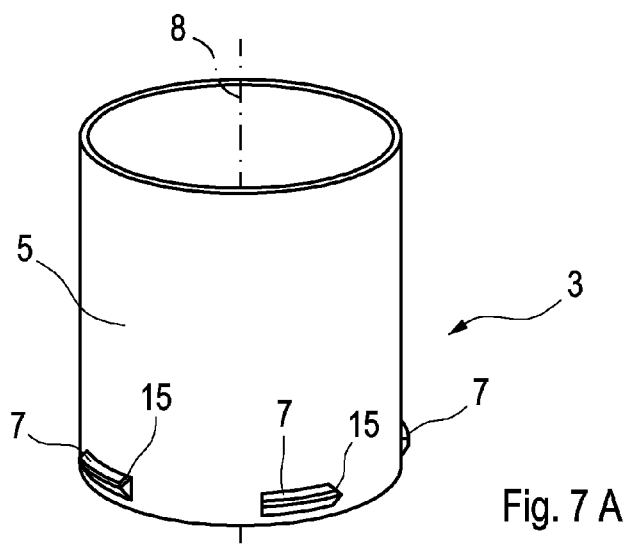
FIG. 7 shows another connecting body in a perspective view (A), in a side view (B) and in an axial view (C)
Figure 7:
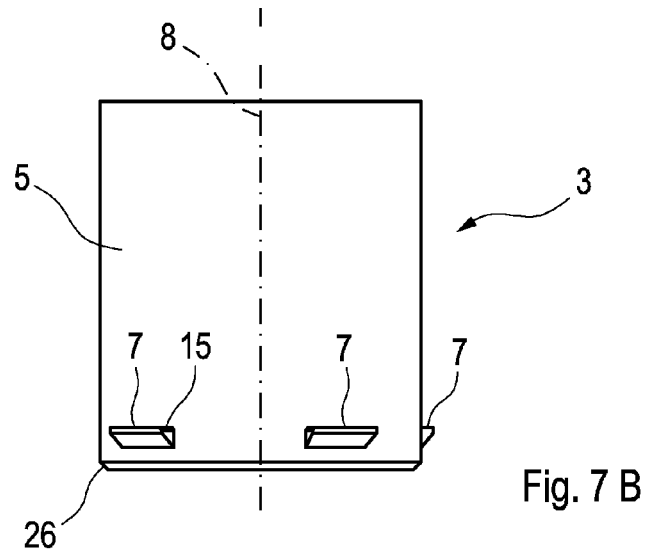
Figure 7:
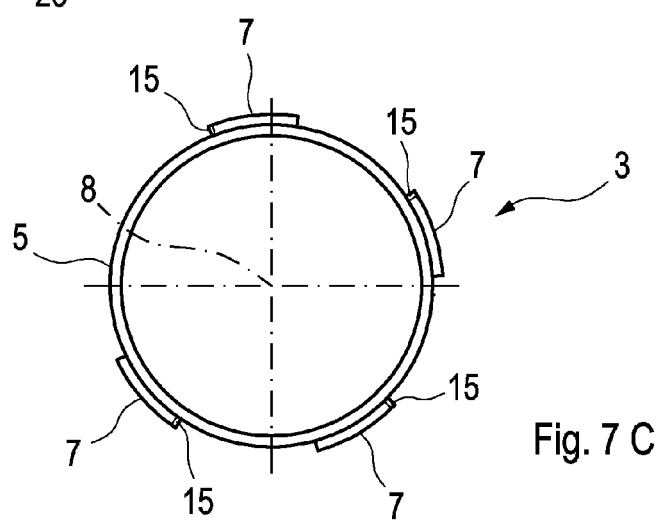

According to the FIGS. 4 and 7, the detent elements 7 can optionally have lead-in chamfers 15 which are oriented in the circumferential direction. During the rotation of the retaining ring 9, these lead-in chamfers 15 likewise facilitate the movement of the detent contours 10 over the detent elements 7. They help axially driving the detent elements 7 in the insertion direction 14. In particular, during the rotation of the retaining ring 9 into the locking position, the lead-in chamfers 15 of the detent elements 7 interact with the lead-in chamfers 13 of the detent contours 10. For this, the lead-in chamfers 13 of the detent contours 10 and the lead-in chamfers 15 of the detent elements 7 can be equipped with the same ramp angles.

Aside from the lead-in chamfers 13 and 15, the detent elements 7 and the detent contours 10 extend in each case in the circumferential direction, namely in a common plane which runs perpendicular to the longitudinal center axis 8. Thus, aside from the lead-in chamfers 13, 15, the detent elements 7 and the detent contours 10 have no slope. Therefore, in the case of a tensile load acting on the connecting bodies 5, 6, no torques can be transmitted onto the retaining ring 9 so that the risk is reduced that the retaining ring 9 rotates automatically under tensile load of the connecting bodies 5, 6 into its unlocking position.

According to the FIGS. 1-7, the second connecting body 6 can have an annular step 16 which extends in a plane which runs transverse to the longitudinal center axis 8. In the inserted state and with the retaining ring 9 displaced into the locking position, the first connecting body 5 rests axially on the front side against this annular step 16. Of particular advantage is the embodiment shown here in which the two connecting bodies 5, 6 abut axially against each other via a joint 17, wherein at said joint 17, said bodies have the same flow cross-sections. Thus, the transition takes place without a step. In the example, the two connecting bodies 5, 6 have in each case a flow cross-section which is constant in the axial direction. As a result, the coupling device 2 has an extremely low flow resistance. The first connecting body 5 abuts with its axial front side against the joint 17 while the second connecting body 6 abuts with the annular step 16 against the joint 17.

The second connecting body 6 has in addition a collar 18 which encloses the annular step 16 in the circumferential direction and which, in the axial direction toward the first connecting body 5, protrudes from the second connecting 6 or the annular step 16. In this collar 18, the retaining ring 9 is rotatably arranged. The collar 18 forms an enclosure for the retaining ring 9. On the collar 18, holding elements 19 can be formed which protrude radially inward and positively engage over the retaining ring 9, at least when the retaining ring 9 is in its locking position. Hereby, the retaining ring 9 is positively secured on the second connecting body 6 against axial withdrawal, at least in the locking position. Said collar 18 can have at least one radial aperture 20 through which an actuating element 21 of the retaining ring 9 protrudes radially. The aperture 20 is dimensioned such that it allows a displacement of the actuating element 21 within the aperture 20 in such a manner that the retaining ring 9 can be rotated between the unlocking position and the locking position. In particular, the aperture 20 in connection with the actuating element 21 can define end stops for the rotational movement of the retaining ring 9. Through the actuating element 21, forces for rotatably displacing the retaining ring 9 can be transmitted.

The retaining ring 9 is preferably a component which, with regard to the two connecting bodies 5, 6, is produced separately and can be inserted into the collar 18. Once the retaining ring 9 is inserted in the second connecting body 6 or in the collar 18, said retaining ring is captively arranged in the second connecting body 6. This loss prevention mechanism is implemented for the locking position through the aforementioned holding elements 19 which radially overlap the retaining ring 9. For this radial overlap, the retaining ring 9 has collar segments 22, each of which protrude radially outward in the region of the apertures 11. In the region of the detent contours 10, in particular centrally, the retaining ring 9 has in each case a nose 23 which, in the radial direction, allows only a comparatively small overlap of the holding elements 19 when the retaining ring 9 is rotated into its unlocking position. This overlap, which is small compared to the collar segments 22, provides for the required loss prevention in the unlocking position of the retaining ring 9. The small overlap enables at the same time assembly and disassembly of the retaining ring 9, because the overlap can easily be overcome through elastic deformation of the collar 18. With regard to the collar segments 22, the noses 23 can be arranged axially offset toward the annular step 16. On the one hand, this ensures sufficient loss prevention while, on the other, assembly and disassembly is made easier due to the provided axial play.

According to the FIGS. 2C and 5, the retaining ring 9 has an optional rib segment 24 which protrudes radially inward, namely approximately as far as the detent contours 10. This rib segment 24 is located in a circumferential section which lies between two detent contours 10 and in which the actuating element 21 is arranged. In the case of this circumferential section, the detent contours 10 adjacent thereto have a circumferential distance which is greater than the circumferential distances between the other detent contours 10. The rib segment 24 simplifies the rotatability of the retaining ring 9 and prevents in particular tilting of the retaining ring 9 on the first connecting body 5.

Expediently, the detent elements 7 and the detent contours 10 are arranged asymmetrically in the circumferential direction so that the connecting bodies 5, 6 can be inserted into each other only in a predetermined relative rotational position, thereby increasing installation reliability.

In the embodiment shown here, the collar 18 has further apertures 25, each of which are arranged between adjacent detent contours 10. These additional apertures 25 increase in particular the dimensional elasticity of the collar 18, thereby simplifying assembly and, where applicable, disassembly of the retaining ring 9.

According to FIGS. 7A and 7B, the second connecting body 5 has a chamfer 26 located radially on the outside of the axial front side leading during insertion, which facilitates penetrating into the seal 12.

Figure 2:
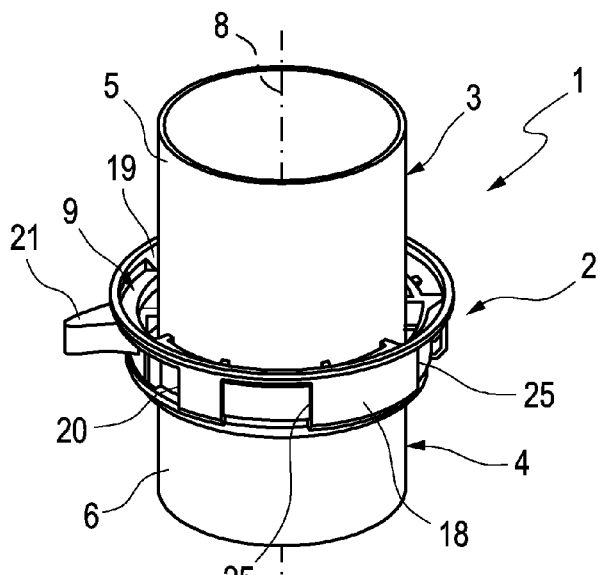
FIG. 2 shows a coupling device in a locked state in a perspective view (A), in a side view (B) and in an axial view (C)
Figure 2:
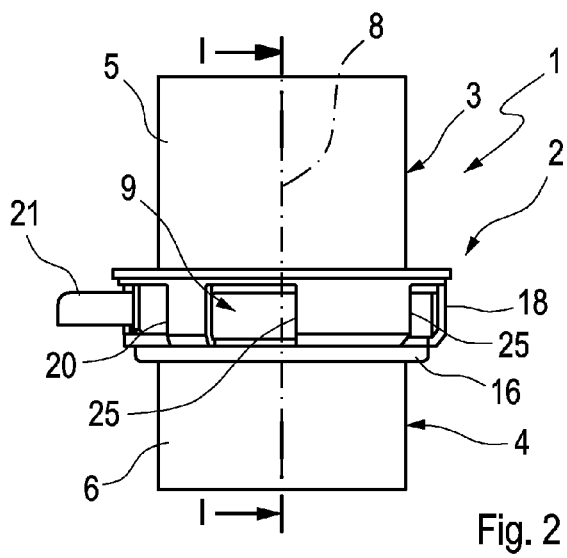
Figure 3:
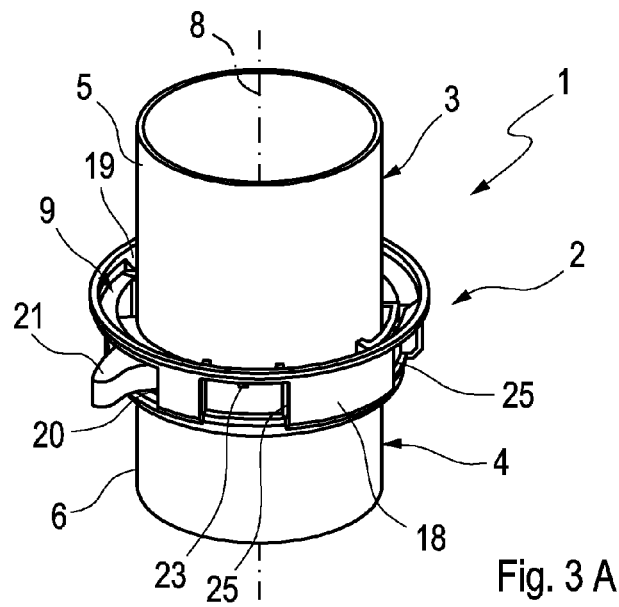
FIG. 3 shows views as in FIG. 2, but in an unlocked state.
Figure 3:
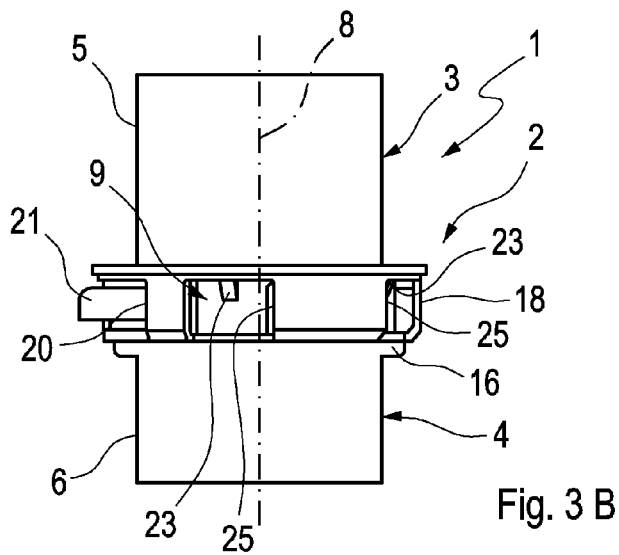
Figure 3:
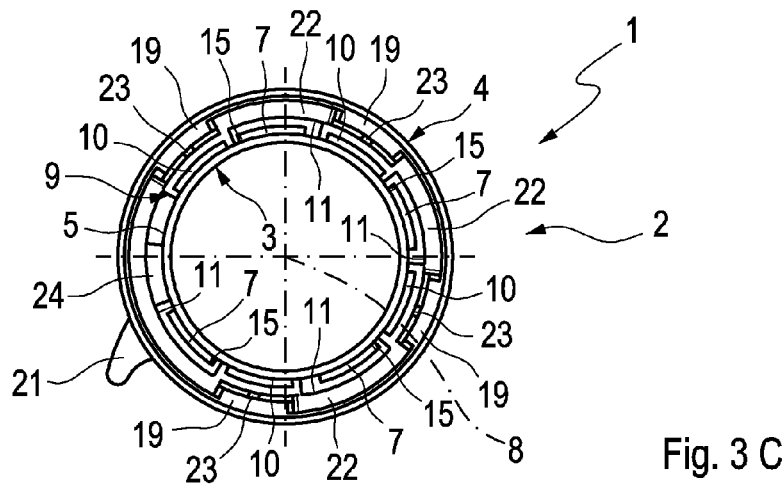
Figure 6:
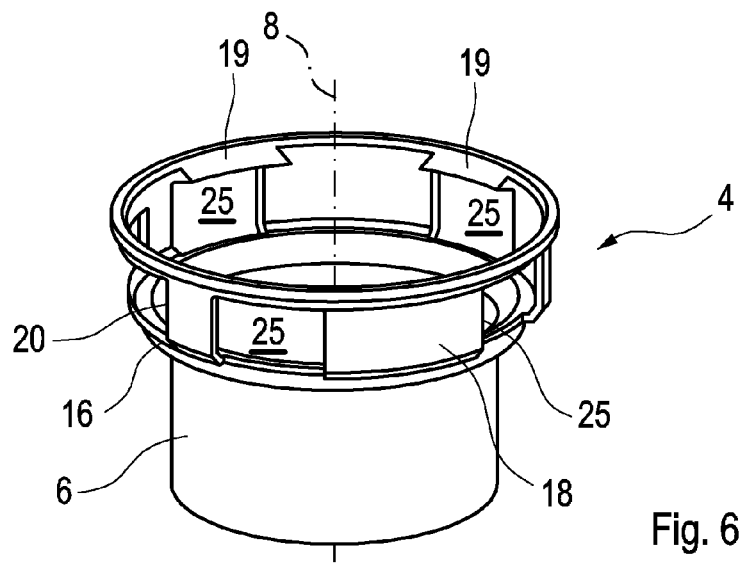
FIG. 6 shows a connecting body of the coupling device in a perspective view (A), in a side view (B) and in an axial view (C)
Figure 6:
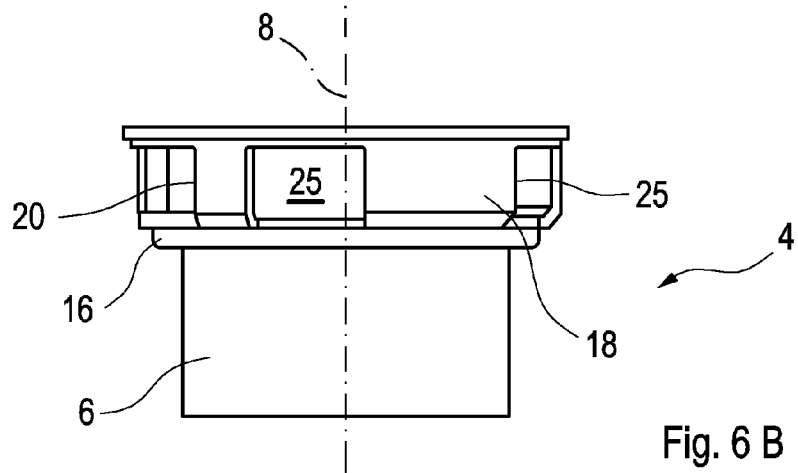
Figure 6:
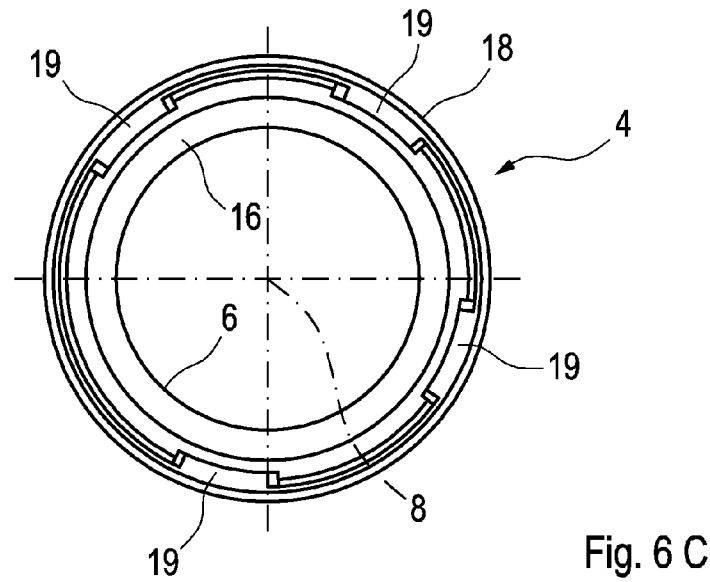

FIG. 1 shows the inserted and locked state of the coupling device 2. FIG. 2 also shows the inserted and locked state of the coupling device 2. FIG. 3 shows the inserted but unlocked state of the coupling device 2. FIG. 4 shows the disassembled state of the coupling device 2. FIG. 5 shows the retaining ring 9 alone. FIG. 6 shows the second connecting body 6 alone. FIG. 7 shows the first connecting body 5 alone.

According to the FIGS. 8 to 13, the coupling device 2 is in addition equipped with a detent device 27. The detent device 27 generates rotation prevention for the retaining ring 9 when the latter is in its locking position. The detent device 27 thereby prevents the retaining ring 9 from rotating from its locking position into its unlocking position. The operational reliability of the coupling device 2 introduced here is increased by means of the detent device 27.

The detent device 27 can comprise at least one detent 28 and at least one counter detent 29 complementary thereto. In the examples shown here in the FIGS. 8 to 13, the detent device 27 comprises in each case exactly one detent 28 and in each case exactly one counter detent 29. However, it is clear that for other embodiments, two or more detents 28 and/or two or more counter detents 29 can be present.

The respective detent 28 is formed on the retaining ring 9 while the respective counter detent 29 is formed on one of the connecting bodies 5, 6. Expediently, the counter detent 29 is formed on the second connecting body 6. In this manner, a defined relative position between counter detent 29 and retaining ring 9 is given, independent of the rotational position of the first connecting body 5. Furthermore, with the arrangement of the counter detent 29 on the second connecting body 6, the retaining ring 9 can be interlocked in the locking position, regardless of whether the first connecting body 5 is present or not.

For interlocking the retaining ring 9 in the locking position, the detent device 27 operates in the usual manner. If the retaining ring 9 is rotated from its unlocking position toward the locking position, the detent 28 moves over the counter detent 29 and upon reaching the locking position, effects the desired interlock which goes hand in hand with a positive rotation prevention in the opposite rotation direction.

Figure 8:
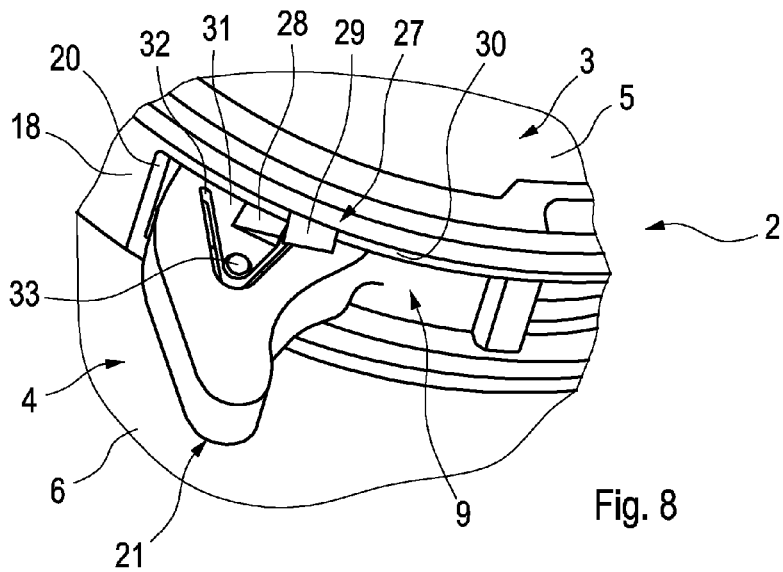
FIG. 8 shows a perspective view on the coupling device in the region of a detent device.
Figure 9:
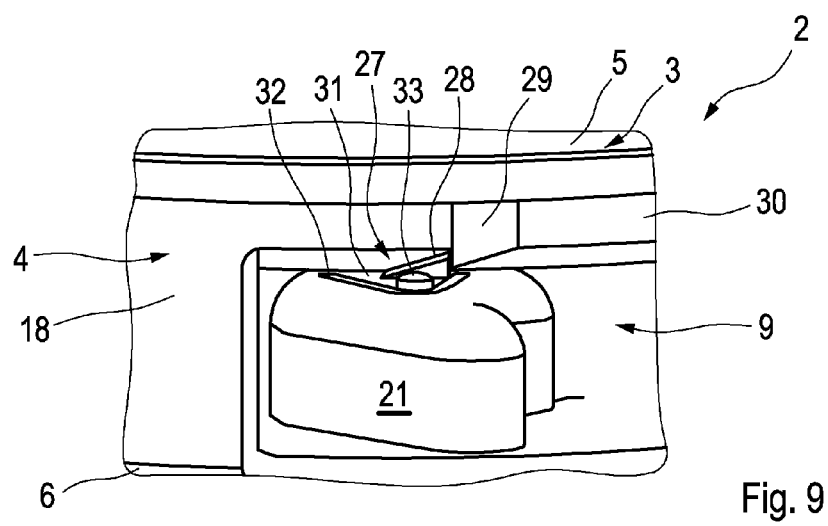
FIG. 9 shows a radial view on the region of the detent device.
Figure 10:
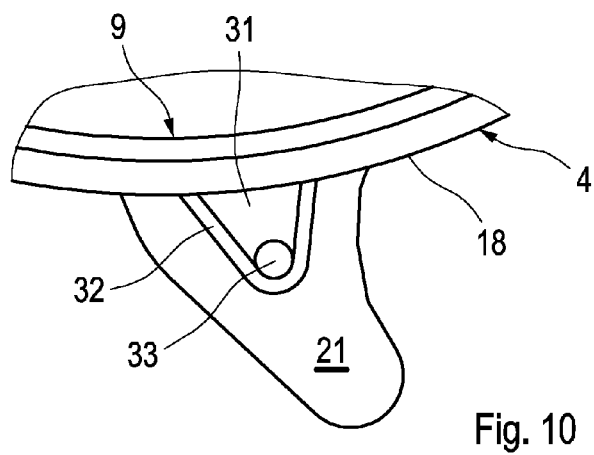
FIG. 10 shows an axial view on the region of the detent device.

In the embodiment shown in the FIGS. 8 to 10, the detent 28 is formed on the actuating element 21 of the retaining ring 9. In this case, the counter detent 29 is formed complementary thereto in the region of the aperture 20 which is recessed on the collar 18 and through which the actuating element 21 protrudes. The counter detent 29 is formed on an enclosure 30 of the aperture 20 or on the collar 18.

For releasing the interlock, the detent 28 is arranged to be spring-elastically movable relative to the counter detent 29 and transverse to the rotational direction of the retaining ring 9, thus transverse to the circumferential direction. In the example of the FIGS. 8 to 10, the detent 28 is arranged on a spring tongue 31 which is axially movable in a spring-elastic manner. The spring tongue 31 is cut free from the actuating element 21 by means of a cut-out contour 32. In the example, said cut-out contour 32 is V-shaped. In the example, the spring tongue 31 has at its end a pin or stud 33 which protrudes axially and which simplifies a manual deflection of the spring tongue 31 for releasing the interlock. The detent 28 is positioned distal to the free end of the spring tongue 31 so that said detent is arranged in a comparatively stable position.

Figure 11:
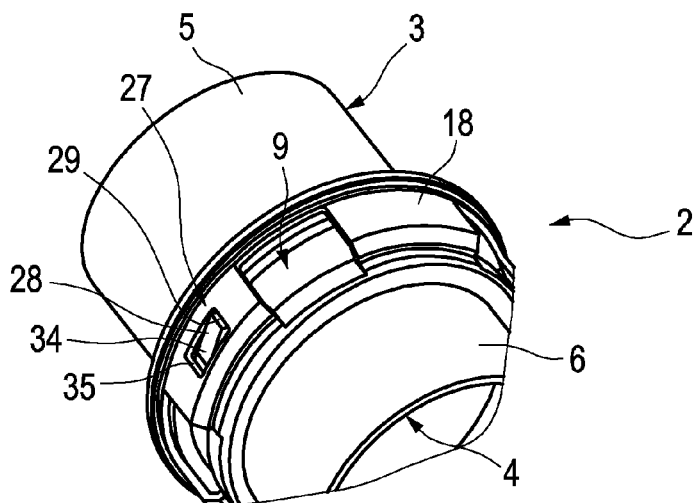
FIG. 11 shows a perspective view of the coupling device with a different detent device.
Figure 12:
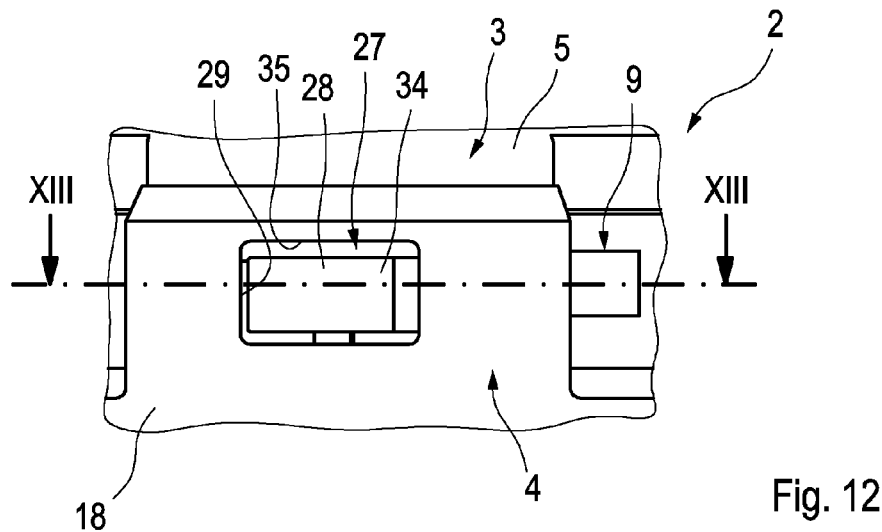
FIG. 12 shows a radial view on the region of the other detent device.
Figure 13:
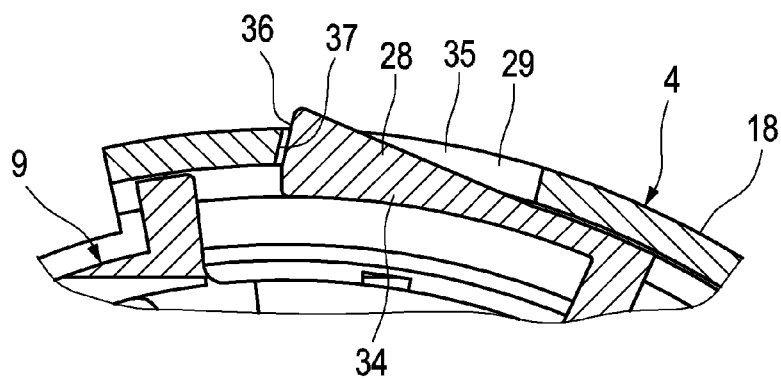
FIG. 13 shows a sectional view according to section line XIII in FIG. 12 in the region of the detent device.

In the embodiment shown in the FIGS. 11 to 13, the detent 28 is equipped with a detent arm 34 which is arranged on the retaining ring 9 to be spring-elastic in the radial direction. The counter detent 29, which is complementary thereto, comprises a detent opening 35 formed in the collar 18, which collar encloses the retaining ring 9. Upon reaching the locking position, the detent arm 34 engages radially in the detent opening 35. In order to prevent rotation, the detent arm 34 is supported in the circumferential direction with its free end 36 on an edge 37 of the detent opening 35. The radially spring-elastic detent arm 34 can be radially pushed inward in a particularly simple manner, thus moved inwardly and out of the detent opening 35 in order to release the interlock mechanism again.

Instead of a detent 28 that is movable transverse to the rotational direction of the retaining ring 9, a counter detent 29 that is movable transverse to the rotational direction of the retaining ring 9 can also be provided for releasing the interlock mechanism.

The invention claimed is:

1. A coupling device for the communicating connection of two fluid-conveying components, comprising:
    a first cylindrical connecting body having a plurality of radially outwardly protruding detent elements arranged spaced apart in the circumferential direction,
    a second cylindrical connecting body having a retaining ring rotatably mounted thereon and moveable between a locking position and an unlocking position,
    wherein the retaining ring has detent contours arranged complementary to the detent elements and which are positively engaged with the detent elements in the locking position of the retaining ring,
    wherein the retaining ring has passages located in the circumferential direction between the detent contours arranged complementary to the detent elements and through which the detent elements can be axially fed in the unlocking position of the retaining ring,
    wherein at least one of (i) the retaining ring has lead-in chamfers arranged on the detent contours and (ii) the first connecting body has lead-in chamfers arranged on the detent elements, the respective lead-in chamfers being oriented in the circumferential direction and which, during the rotation of the retaining ring into the locking position, axially drive the detent elements in an insertion direction,
    wherein a detent device is provided for rotatably securing the retaining ring in the locking position,
    wherein the detent device has at least one detent formed on the retaining ring and at least one counter detent formed on the second cylindrical connecting body and with which the detent interlocks upon reaching the locking position,
    wherein the detent has a detent arm arranged on the retaining ring and configured to be spring elastic in the radial direction,
    wherein the counter detent has a detent opening which is formed in a collar enclosing the retaining ring and in which the detent arm radially engages upon reaching the locking position so as to be supported on an edge of the detent opening in order to be rotatably secured in the circumferential direction.

2. The coupling device according to claim 1, wherein the detent is configured to be spring-elastically movable relative to the counter detent and transverse to the rotational direction for releasing the interlock.

3. The coupling device according to claim 1, wherein the counter detent is configured to be spring-elastically movable relative to the detent and transverse to the rotational direction for releasing the interlock.

4. The coupling device according to claim 1, wherein the connecting bodies in the locking position of the retaining ring are secured against rotation relative to each other through nonpositive locking.

5. The coupling device according to claim 1, further comprising a seal disposed and compressed between the connecting bodies, the seal configured to create a force for securing against rotation of at least a substantial proportion of the connecting bodies relative to each other.

6. The coupling device according to claim 1, wherein the connecting bodies are secured against rotation through positive locking in an assembled state, wherein an axial guide is provided for preventing rotation.

7. The coupling device according to claim 1, wherein the retaining ring is configured to be dimensionally elastic to align the detent contours with the detent contours for axially inserting and interlocking the detent elements with the detent contours when the retaining ring is in its locking position.

8. The coupling device according to claim 1, wherein the retaining ring has lead-in chamfers arranged on the detent contours.

9. The coupling device according to claim 1, wherein the first connecting body has lead-in chamfers arranged on the detent elements.

10. The coupling device according to claim 1, wherein the connecting bodies abut axially and flush against each other with equal flow cross-sections.

11. The coupling device according to claim 1, further comprising a seal configured to seal the first connecting body with respect to the second connecting body and be arranged at least one of axially and radially.

12. The coupling device according to claim 1, wherein at least one of the connecting bodies is integrally formed on at least one of an associated component.

13. The coupling device according to claim 1, wherein the components include a portion of at least one of: an air filter housing, a fresh air distributor housing, a compressor housing, a supercharger housing, an intake module housing, a line section, a pipe, and a hose.

14. The coupling device according to claim 1, wherein the second connecting body has an annular step against which the first connecting body rests axially with its front side.

15. The coupling device according to claim 1, wherein the retaining ring is configured to be dimensionally stable and axially inserted into the first connecting body if the retaining ring is in its unlocking position and the detent elements are aligned with the passages.

16. The coupling device according to claim 1, wherein the collar has at least one radial aperture through which an actuating element of the retaining ring protrudes and which enables a displacement of the actuating element within the aperture for rotating the retaining ring between the unlocking position and the locking position.

17. The coupling device according to claim 1, wherein the retaining ring is insertable into at least one of the second cylindrical connecting body and the collar such that the retaining ring is captively arranged in the second cylindrical connecting body.

18. A fresh air system for an internal combustion engine comprising: two components in a communicating connection with a coupling device, the coupling device including a first cylindrical connecting body having a plurality of radially outwardly protruding detent elements arranged spaced apart in the circumferential direction and a second cylindrical connecting body having a retaining ring rotatably mounted thereon and moveable between a locking position and an unlocking position,
    wherein a detent device is provided for rotatably securing the retaining ring in the locking position,
    wherein the detent device has at least one detent formed on the retaining ring and at least one counter detent formed on the second cylindrical connecting body and with which the detent interlocks upon reaching the locking position,
    wherein the detent has a detent arm arranged on the retaining ring and configured to be spring elastic in the radial direction,
    wherein the counter detent has a detent opening which is formed in a collar enclosing the retaining ring and in which the detent arm radially engages upon reaching the locking position so as to be supported on an edge of the detent opening in order to be rotatably secured in the circumferential direction, wherein the collar has at least one radial aperture through which an actuating element of the retaining ring protrudes and which enables a displacement of the actuating element within the aperture for rotating the retaining ring between the unlocking position and the locking position.

19. The fresh air system according to claim 18, wherein the second connecting body includes an annular step from which the collar axially protrudes, the collar enclosing the annular step in the circumferential direction and in which the retaining ring is rotatably arranged.

20. The fresh air system according to claim 18, wherein the collar has holding elements which protrude radially inward and which positively engage over the retaining ring, at least in the locking position of the latter.

21. The fresh air system according to claim 18, wherein the retaining ring is captively arranged in the second connecting body.

22. A coupling device for the communicating connection of two fluid-conveying components, comprising:

a first cylindrical connecting body having a plurality of radially outwardly protruding detent elements arranged spaced apart in the circumferential direction and a second cylindrical connecting body having a retaining ring rotatably mounted thereon and moveable between a locking position and an unlocking position, wherein a detent device is provided for rotatably securing the retaining ring in the locking position, wherein the detent device has at least one detent formed on the retaining ring and at least one counter detent formed on the second cylindrical connecting body and with which the detent interlocks upon reaching the locking position, wherein the detent has a detent arm arranged on the retaining ring and configured to be spring elastic in the radial direction, wherein the counter detent has a detent opening which is formed in a collar enclosing the retaining ring and in which the detent arm radially engages upon reaching the locking position so as to be supported on an edge of the detent opening in order to be rotatably secured in the circumferential direction, wherein the retaining ring is insertable into at least one of the second cylindrical connecting body and the collar such that the retaining ring is captively arranged in the second cylindrical connecting body.

23. The coupling device according to claim 22, wherein the second connecting body has an annular step against which the first connecting body rests axially with its front side, wherein the collar protrudes axially from the annular step, the collar enclosing the annular step in the circumferential direction and in which the retaining ring is rotatably arranged.

* * * * *